(12) United States Patent
Smith et al.

(10) Patent No.: US 6,314,834 B1
(45) Date of Patent: Nov. 13, 2001

(54) HOLLOW CRANK ARM

(75) Inventors: Garrett A. Smith; Michael A. Kozuschek; David A. Nelson, all of San Luis Obispo, CA (US)

(73) Assignee: Truvativ International Co., Ltd. (TW)

(*) Notice: Subject to any disclaimer, the term of this patent is extended or adjusted under 35 U.S.C. 154(b) by 0 days.

(21) Appl. No.: 09/236,810

(22) Filed: Jan. 25, 1999

(51) Int. Cl.[7] .................................................. G05G 1/14
(52) U.S. Cl. ............................................ 74/594.1; 74/594.2
(58) Field of Search ..................... 74/594.1–594.6, 74/579 R, 579 E, 579 F

(56) References Cited

U.S. PATENT DOCUMENTS

| | | | |
|---|---|---|---|
| 4,358,967 | 11/1982 | Kastan | 74/594.2 |
| 4,704,919 | 11/1987 | Durham | 74/594.1 |
| 4,811,626 | 3/1989 | Bezin | 74/594.1 |
| 5,010,785 * | 4/1991 | Romero | 74/594.1 |
| 5,179,873 | 1/1993 | Girvin | 74/594.1 |
| 5,197,353 | 3/1993 | Trenerry et al. | 74/594.1 |
| 5,435,869 | 7/1995 | Christensen | 156/175 |
| 5,493,937 * | 2/1996 | Edwards | 74/594.1 |
| 5,623,856 | 4/1997 | Durham | 74/594.1 |
| 5,791,202 | 8/1998 | Kardson | 74/594.1 |
| 5,819,600 | 10/1998 | Yamanaka | 74/594.1 |
| 5,845,543 | 12/1998 | Yamanaka | 74/594.1 |
| 5,852,954 | 12/1998 | Yamanaka | 74/594.1 |
| 5,919,599 | 10/1998 | Yamanaka | 74/594.1 |

FOREIGN PATENT DOCUMENTS

| | | | |
|---|---|---|---|
| 3902272 | 8/1990 | (DE) . | |
| 417313 * | 11/1910 | (FR) | 74/594.1 |
| 861561 | 2/1941 | (FR) . | |
| 980071 | 5/1951 | (FR) . | |
| 981600 | 5/1951 | (FR) . | |
| 26220 * | 10/1899 | (GB) | 74/594.1 |
| 22058 * | 11/1910 | (GB) | 74/594.1 |
| 2225296 | 5/1990 | (GB) . | |
| 53662 * | 7/1942 | (NL) | 74/594.1 |

* cited by examiner

*Primary Examiner*—Vinh T. Luong

(57) ABSTRACT

A hollow bicycle crank arm 10 is fabricated from first and second components 11, 21 that are affixed at a joint 20 that is distal from the crank spindle mounting boss 12. The joint 20 is at least partially transverse to the long axis of the crank arm 10. Each component 11, 21 has a relatively-solid mounting boss 12, 22 for attaching a crank spindle or a pedal. One, or both components have a tubular portion 15 integral with the mounting boss 12, 22. Integration of mounting boss and tubular portions enables economic fabrication of a structurally-optimal design, and eliminates the need for a joint proximate to the mounting boss 12, 22.

3 Claims, 9 Drawing Sheets

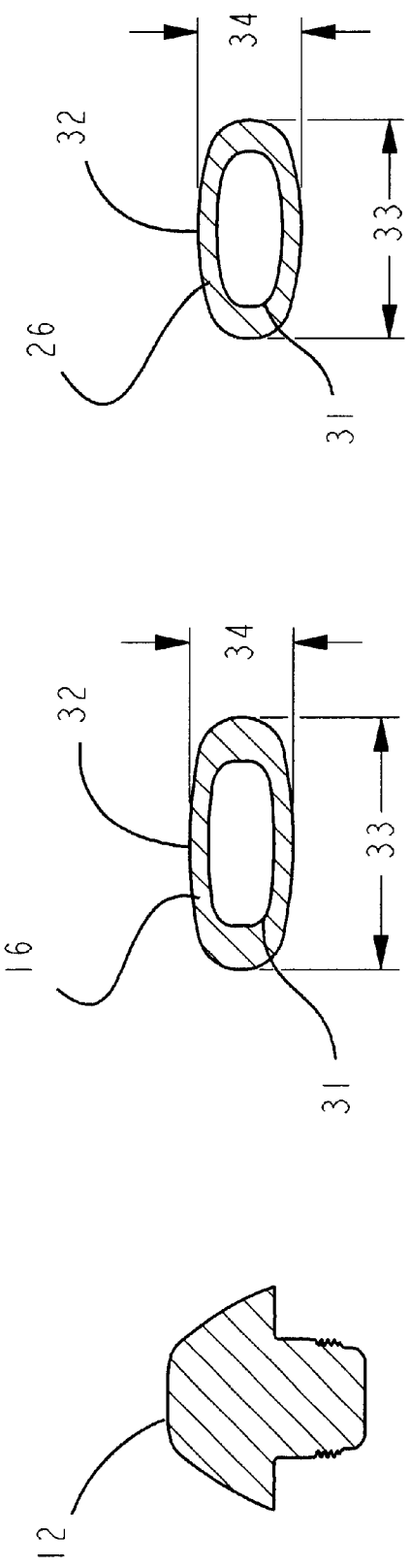

HOLLOW CRANK ARM

BACKGROUND OF THE INVENTION

The present invention relates generally to structural machine components subjected to flexural and torsional loads, and more specifically, to a hollow bicycle crank arm of improved strength-to-weight ratio and reliability.

When a bicycle rider exerts a force on a crank arm, he applies a bending moment that tends to flex it into an arc. A transverse shear (beam shear) force also results from the pedaling force. Because it is laterally offset from the arm, the pedaling force also tends to twist the arm about its long axis. The applied bending moment varies from near-zero at the pedal to a maximum value at the crank spindle. This can cause reliability problems for any joints or welds that are near the crank spindle.

The need to reduce the weight of bicycle components, including crank arms, has resulted in several crank designs that are tubular, or hollow in the central portion. The optimal configuration may be seen to comprise a central, thin-wall tubular portion monolithic with substantially solid end portions that serve as mounting-bosses for a crank spindle and a pedal. The transitions from the solid end portions to the tubular portion are gradual and there are no sharp edges or corners. Sharp edges, corners, abrupt changes in material thickness and other geometric discontinuities induce stress concentrations. Stress concentrations significantly increase stress levels over nominal values, requiring extra material thickness to ensure reliability. A crank arm that is largely free of stress concentrations may have reduced material thickness and weight without any reduction in strength or reliability.

The optimal bicycle crank arm configuration is readily apparent in biological systems subjected to similar structural loads. For example, a human femur is continually subjected to flexure and torsion during walking, running, lifting objects, etc. A cross-section of a femur reveals dense, compact bone at the hip and knee condyles and around the outer perimeter of the central shaft, with porous cancellous bone and non-structural marrow in the shaft's interior region. The optimal crank arm configuration is analogous to a femur, and thus biomimetic. There has been great interest lately, in a wide range of applications, to adapt prima facie optimal biological systems to man-made biomimetic articles. There have been various attempts to economically produce an optimal hollow crank arm.

DISCUSSION OF PRIOR-ART HOLLOW BICYCLE CRANK ARMS

Bezin (U.S. Pat. No. 4,811,626) teaches a hollow crank arm comprised of three components: a tube and two end-lugs. The end-lugs have protrusions that fit within the tube, ready for bonding or welding. The end-lugs are solid to absorb concentrated loads from a crank spindle and pedal. In order to achieve a lightweight assembly, the tube is of thin-wall section or made from fiber composite material. The crank arm has at least one joint proximate to a region of maximum bending moment, where the crank arm mounts to the spindle shaft. Locating a joint near a region of maximum bending moment increases the likelihood of failure unless additional material thickness is provided. Bezin's crank arm also suffers from an abrupt transition where the thin tube meets the solid lug, producing a stress concentration. There is no provision for optimizing the configuration of the components to reduce the stress concentration. If the crank arm is fabricated using a welding process, it is difficult to obtain proper weld penetration in the heavy lug without overheating the thin tube. Instead, it would be preferable to weld metals of similar thickness.

Girvin (U.S. Pat. No. 5,179,873) teaches a crank arm comprised of four components: a tube, two end-lugs and a plate-like redundant doubler which is used to reinforce a weld proximate to a region of maximum bending moment. Girvin discusses configuring the redundant doubler plate to reduce stress concentration at the upper welded interface, but does not address the abrupt transition where the tube otherwise meets the lug. He discusses using a tapered tube to increase the section modulus in regions of high stress, but does not provide for a varying wall thickness. Girvin states that his crank arm is to be made from high strength 4130 steel, permitting a very thin tube to reduce weight. Girvin does not address the issue of satisfactorily welding a thin-wall tube to a more massive lug. He provides no way to adapt the invention to lightweight alloys. Girvin states that the doubler is used to safeguard against tensile failure at the weld. A Girvin crank arm made from a lightweight, low-modulus metal, such as aluminum alloy, could be expected to experience localized, Brazier-type compressive buckling failure prior to any tensile rupture failure in the tube. If Girvin's crank arm were feasible in lightweight alloy, it would not be necessary to specify heavy steel as the preferred material to create a lightweight bicycle component. It would be preferable to provide a crank arm that could be readily adapted to a wide range of materials, and did not require redundant doubling of material to compensate for inherently weak joints proximate to a region of maximum bending moment.

Yamanaka (U.S. Pat. Nos. 5,819,599 and 5,819,600 and 5,845,543) depicts a hollow crank arm comprised of two parts: a forged crank arm with a central, longitudinal groove, and a long cap that is welded over the groove to form a box-beam. The welded surfaces are substantially parallel to the long axis of the crank arm, which results in a relatively large weld area, long processing time, and high fabrication expense. The cross-section of the resulting box-beam is substantially rectangular, which is structurally less efficient than a circular or ovoid cross-section. The sharp interior corners and abrupt changes in wall thickness cause stress concentrations, and the flat sides do not efficiently transmit torsional shear forces. There is relatively little space enclosed by the box-beam, owing to the relatively thick walls, which results in a heavy, stiff and rigid crank arm. Yamanaka discusses shaping the long axis of the groove into a "ship hull shape" to better distribute the stresses in the crank arm, but provides no other means of optimizing the crank arm. Yamanaka's patents claim a novel means of mounting a crank spindle to a crank arm, with no discussion of adapting, modifying or improving the hollow crank arm depicted. It would be desirable to provide a hollow crank arm that was largely free of stress concentrations, had relatively thin walls in the tubular portion, enclosed a relatively large volume of space to reduce weight, comprised minimal welded area, and could be readily designed and fabricated in the most efficient configuration for an optimal degree of flexibility.

OBJECTS AND ADVANTAGES OF THE PRESENT INVENTION

One of the objects of the present invention is to provide a bicycle crank arm of improved reliability and strength, while simultaneously reducing weight. Another object of the present invention is to provide a hollow crank arm that may be readily optimized with respect to material configuration, strength and flexibility, resulting in a biomimetic component of superior performance. Another object of the present invention is to produce a crank arm that is largely free of stress concentrations, and thus highly resistant to fatigue-type failure. Still another object of the present invention is to provide a crank arm that may be readily and economically manufactured to an optimal design, with minimal compromises and allowances for fabrication process limitations. Yet another object of the present invention is to provide a crank arm that may be readily fabricated from a wide variety of common materials. A further object of the present invention is to provide a crank arm that does not have joints located near regions of high bending moment. Another object of the present invention is to provide for joining of components at regions of substantially equal wall thickness. Still another object of the present invention is to provide a crank arm whose components take advantage of anisotropic material properties resulting from a fabrication process. Additional objects and advantages of the present invention will become apparent from the drawings and detailed description of the preferred embodiments.

SUMMARY OF THE INVENTION

A hollow bicycle crank arm has a central tubular portion to reduce weight, and two mounting-boss portions for mounting a crank spindle and pedal during use. The crank arm is fabricated from two partial crank arm components. Both components have a mounting-boss portion, and at least one has a tubular portion monolithic with a mounting-boss portion. Each component also has a mating surface that is substantially transverse to the long axis of the completed crank arm. During fabrication of the crank arm, the mating surfaces are permanently affixed to form a joint that is distal from the boss portion that accepts a bicycle's crank spindle, a region of maximum bending moment during use. Monolithic forming of a tubular portion with a mounting-boss portion allows for a structurally-optimal configuration of the transition from thin-wall tube to solid mounting-boss, and ensures that no joint or seam is proximate to a region of maximum bending moment.

BRIEF DESCRIPTION OF THE PATENT DRAWINGS

FIG. 3A shows an end-elevation cross-sectional view along the line 2B—2B of the crank arm of FIG. 2A.

FIG. 3B shows another end-elevation cross-sectional view along the line 3A—3A of the crank arm of FIG. 2A.

FIG. 3C shows another end-elevation cross-sectional view along the line 3B—3B of the crank arm of FIG. 2A.

DETAILED DESCRIPTION OF THE PREFERRED EMBODIMENTS

Figure 1A:
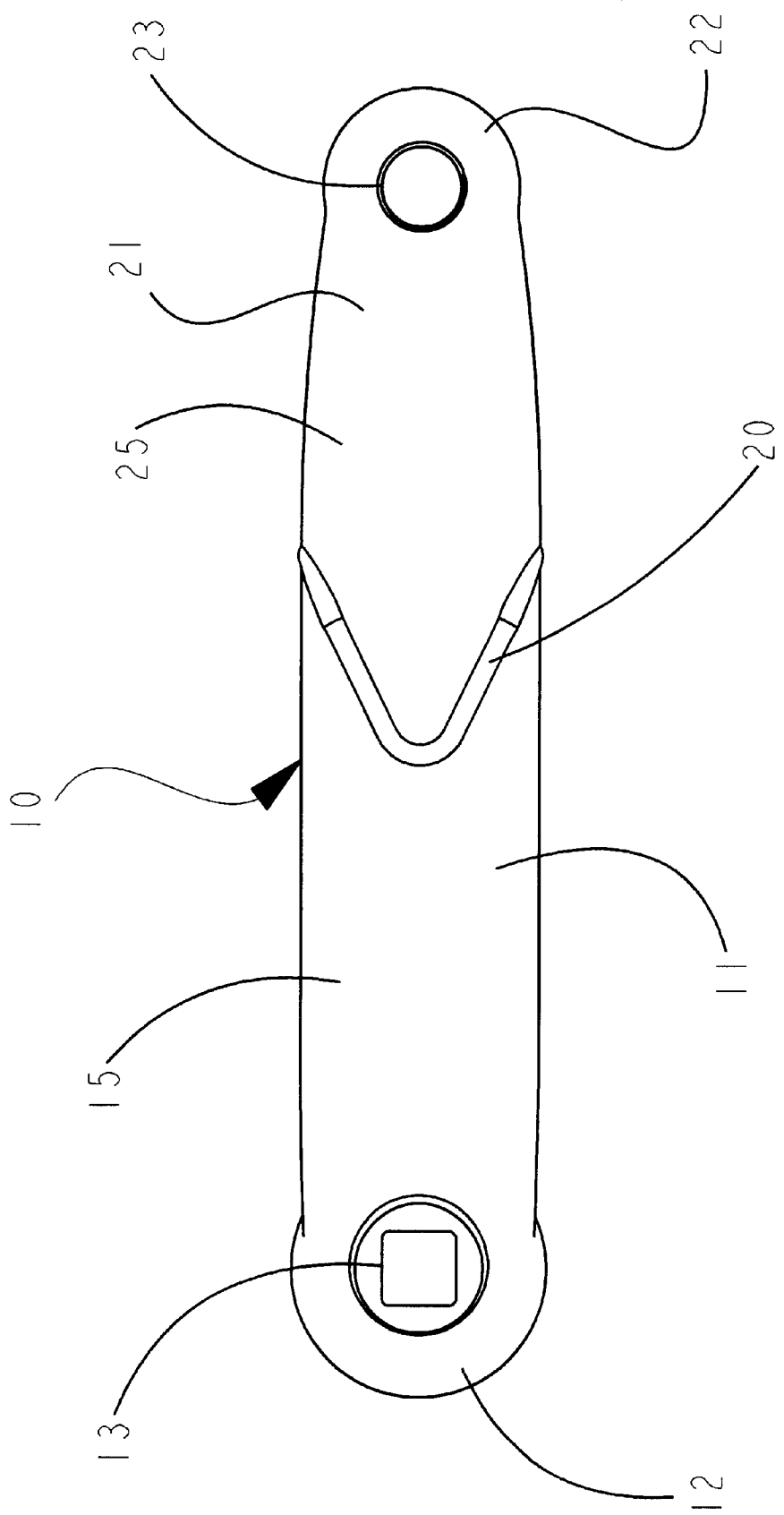
FIG. 1A shows a front view of a particular embodiment of a crank arm according to the present invention.
Figure 1B:
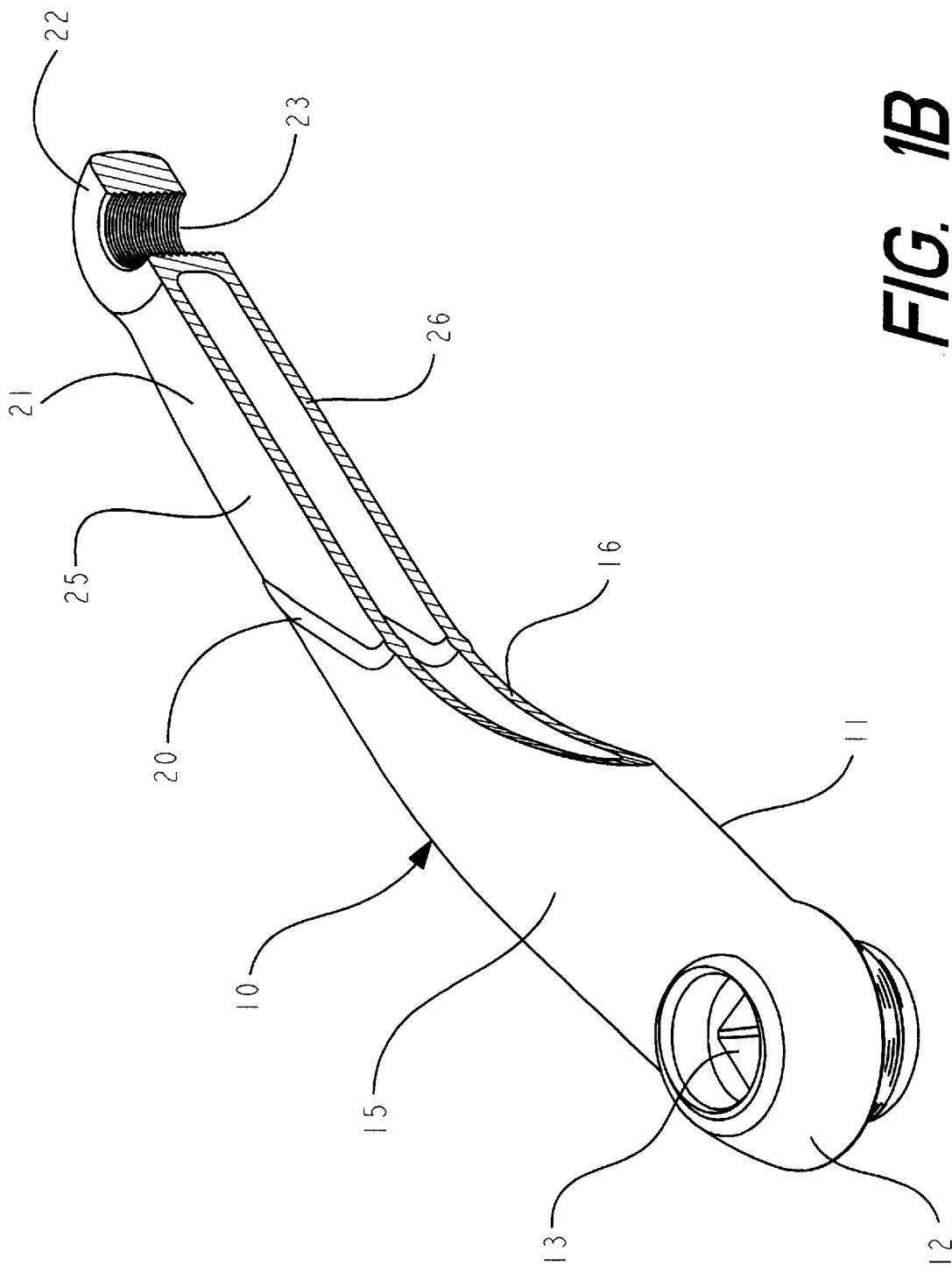
FIG. 1B shows a perspective view of a partially-cut hollow crank arm of the present invention.

FIG. 1 shows a hollow bicycle crank arm 10 comprising a first mounting-boss portion 12 and a second mounting-boss portion 22, which define a long axis of crank arm 10. Mounting-boss portions 12, 22 are substantially solid to absorb concentrated forces applied to crank arm 10 by a crank spindle and a pedal. Central tubular portion 15, 25 comprises a thin wall 16, 26 to reduce weight, and is monolithic with mounting-boss portions 12, 22. Tubular portion 15, 25 is devoid of sharp corners, abrupt changes in material thickness, and other geometric discontinuities that induce stress concentration, and increase stress levels over nominal values. Monolithic forming of tubular portions 15, 25 with boss portion 12, 22 permits economic fabrication of structurally-optimal transitions therebetween, and a reduction in weight of crank arm 10.

Crank arm 10 is fabricated from two partial crank arm components 11, 21 that are permanently affixed at joint 20, which is distal from first mounting-boss portion 12. Boss portion 12 is a region of maximum bending moment during use of crank arm 10, and disposing joint 20 distal from portion 12 improves strength and reliability of crank arm 10.

A first mounting means 13 and a second mounting means 23 are located within first and second mounting-boss portions 12, 22. Mounting means 13, 23 attach crank arm 10 to a bicycle's crank spindle (not shown), and to a bicycle's pedal (not shown). For purposes of illustration, mounting means 13 is a square aperture that may slidably engage with and affix to a standard square end of a bicycle crank spindle. For purposes of illustration, mounting means 23 is a threaded hole that may engage with a standard threaded stud of a bicycle pedal. Differing applications will generally dictate differing mounting means 13, 23, such as splines, press-fits, bolts or other means for mounting crank arm 10. In general, a crank arm 10 intended for general-purpose use preferably comprises standardized mounting means 13, 23 to permit utility by a large number of users, whereas a crank arm 10 intended for high-performance, competition or other specialized use, may utilize alternative mounting means. Further, specialized mounting means may eventually find wide acceptance and use, and thereby become standardized means.

Figure 2A:
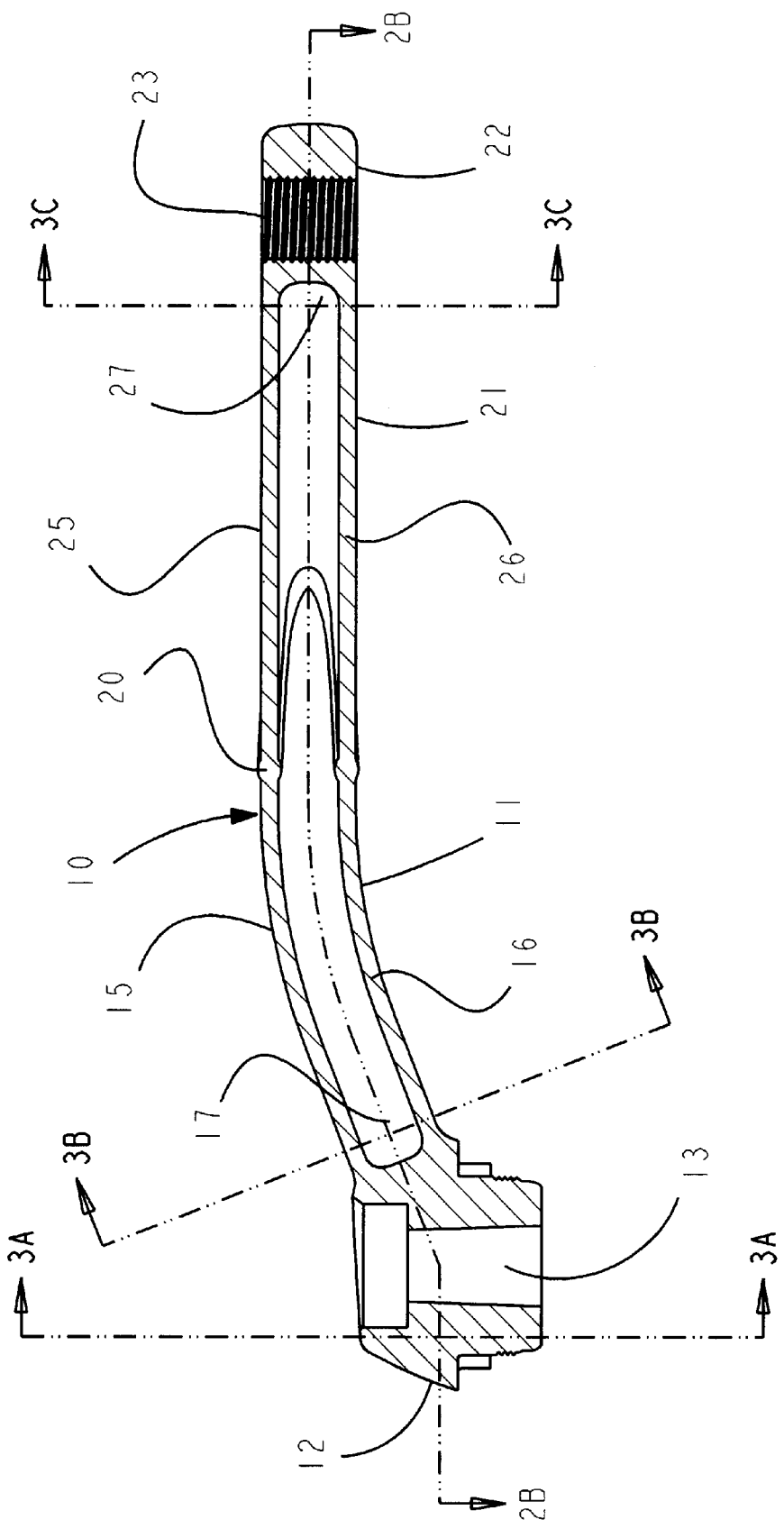
FIG. 2A shows an elevation cross-sectional view of the crank arm of FIG. 1.
Figure 2B:
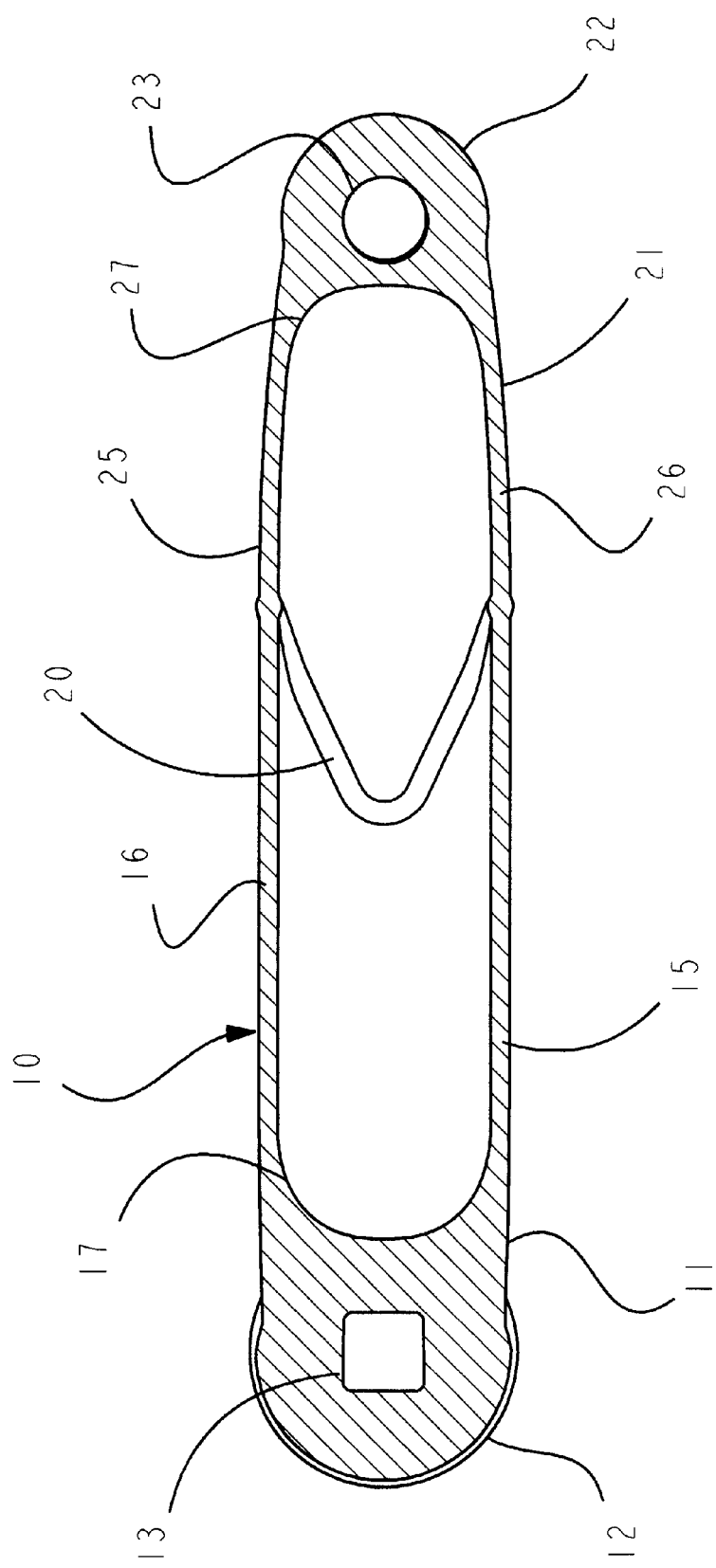
FIG. 2B shows a plan cross-sectional view along the line 2A—2A of the crank arm of FIG. 1A.

FIGS. 2A, 2B are longitudinal cross-sections of crank arm 10, showing transition regions 17, 27 where mounting-boss portions 12, 22 meet tubular portion 15, 25. Transition regions 17, 27 comprise gradual variations in wall thickness 16, 26 to minimize stress concentration. Tubular region 15, 25 is devoid of sharp corners, abrupt changes in wall thickness, and other geometric discontinuities that induce stress concentration. Optimal dimensions of wall thickness 16, 26 and transitional regions 17, 27 may be determined by means of a mathematical model, preferably through the use of computer analysis.

FIGS. 3A–3C show transverse cross-sections of crank arm 10. FIG. 3A is a cross-section through first mounting-boss portion 12, which is substantially solid to absorb concentrated loads applied during use. FIG. 3B is a cross-section through central tubular portion 15 proximate to first mounting-boss portion 12, and FIG. 3C is a cross-section through central tubular portion 25 proximate to second mounting-boss portion 22. The cross-sections of FIGS. 3B, 3C comprise annular ovoids that vary along an axial dimension of crank arm 10. Crank arm wall thickness 16, 26 varies in a longitudinal dimension of crank arm 10, and varies in an angular dimension around a cross-section normal to a longitudinal dimension of crank arm 10. Tubular portions 15, 25 comprise substantially rounded corners 31 and sides 32 to ensure good torsional strength and minimal stress concentration. Section depth 33 is greater than section width 34 to ensure good flexural strength. The ratio of depth 33 to width 34 varies over the length of crank arm 10, to accommodate corresponding variations in applied bending moment during use.

Figure 4:
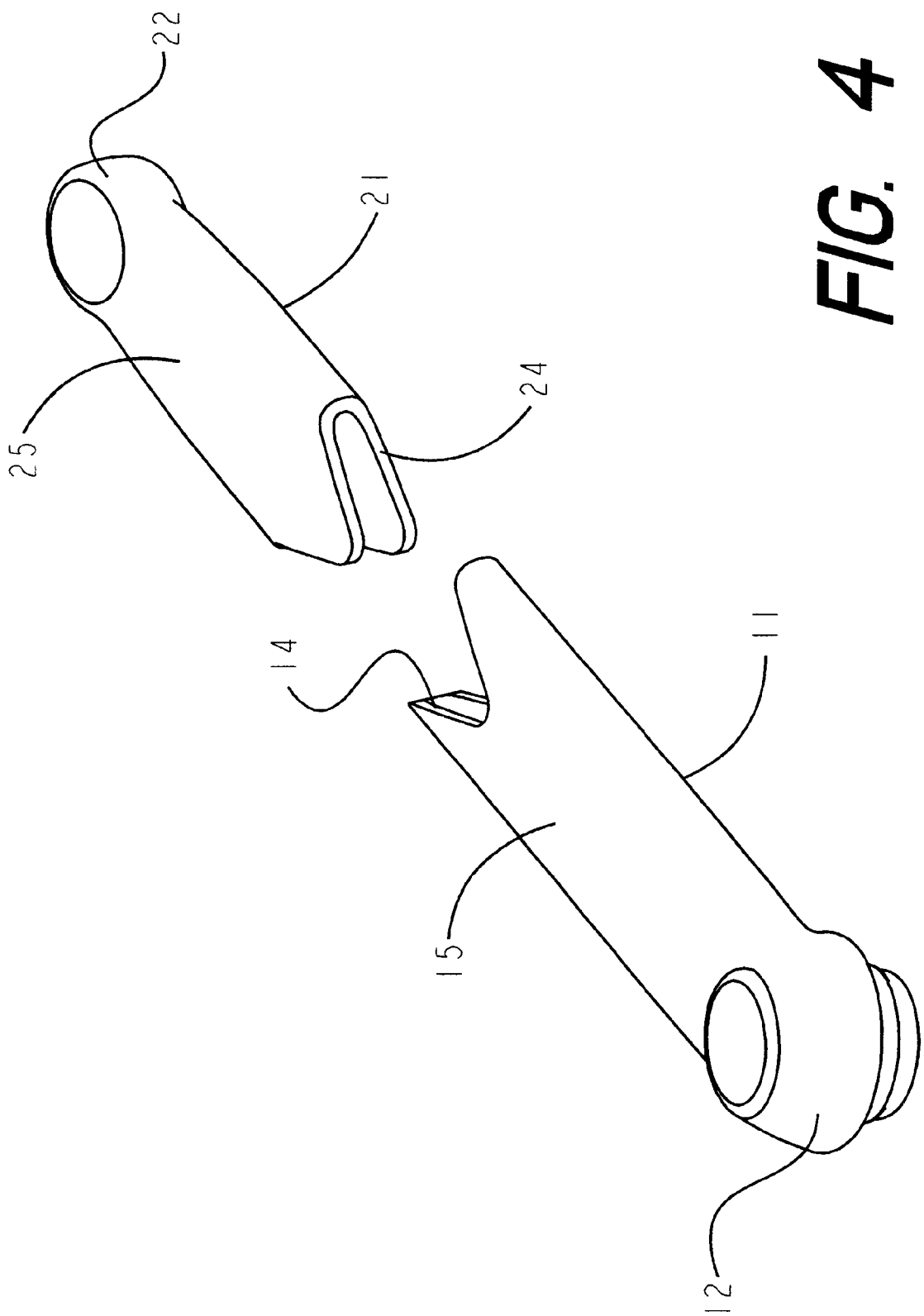
FIG. 4 shows an exploded perspective view along the line 3C—3C of the crank arm of FIG. 2A during an intermediate fabrication stage, showing two partial crank arm components prior to affixion.

FIG. 4 shows crank arm 10 during an intermediate fabrication step, showing a first partial crank arm component 11 and a second partial crank arm component 21. First component 11 comprises a first mounting-boss portion 12 monolithic with a first tubular portion 15. Tubular portion 15 terminates in a first mating surface 14 that is distal from boss portion 12. Mounting-boss portion 12 is a region of maximum bending moment during use of crank arm 10, and disposing surface 14 distal from boss 12 ensures that it is not proximate to a region of maximum bending moment. Second partial crank arm component 21 comprises a second mounting-boss portion 22 monolithic with a second tubular portion 25. Tubular portion 25 terminates in a second mating surface 24 that is the complement of surface 14. During fabrication of crank arm 10, mating surfaces 14, 24 are brought into intimate surface contact and permanently affixed by suitable means which may comprise welding, brazing, bonding, mechanical interlocking of components, filament winding or other conventional means. The most appropriate affixation means is dictated by material selection, fabrication processes, and intended use of crank arm 10.

Mating surfaces 14, 24 are at least partially transverse to a long axis of crank arm 10. Surfaces 14, 24 preferably fit together with a minimum of gaps and spaces, and may comprise various configurations and contours. For a purpose of illustration, surfaces 14, 24 are shown as complementary halves of a modified-scarf joint. Modified-scarf surfaces 14, 24 allow a portion of tensile and compressive normal forces to be transferred from component 11 to component 21 as shear forces, which may improve strength and reliability of crank arm 10. Contact surface area of surfaces 14, 24 is also increased over planar surfaces, which may further improve strength and reliability of crank arm 10. Modified-scarf surfaces 14, 24 are preferable when a welding process is used to affix components 11, 21 together. Increased contact surface area and strength of joint 20 may offset weld inconsistencies, and improve overall reliability of crank arm 10. Alternative configurations of surfaces 14, 24, including those provided herein, may also be utilized.

Partial crank arm components 11, 21 may be fabricated using conventional manufacturing techniques applicable to deep-section hollow parts. Fabrication of components 11, 21 may comprise machining, forging, casting, molding, drawing, powder-metallurgy, or filament-winding processes, or a combination thereof. Material selection and intended use dictate which processes are preferred in producing components 11, 21.

The present preferred embodiment utilizes a deep-section forging process to economically produce components 11, 21 from high-strength aluminum alloy. Utilization of a deep-section forging process ensures optimal grain boundary orientation along a longitudinal axis of crank arm 10, especially within tubular portions 15, 25. Tubular portions 15, 25 are forged straight, to facilitate the forging process.

Subsequent to forging, component 11 may be bent into a shallow S-shape to provide a small lateral offset of mounting-boss portion 22 with respect to mounting-boss portion 12. Components 11, 21 are then welded together at mating surfaces 14, 24 using an inert gas-shielded arc welding process, or similar fusion welding process. Heat treatment of crank arm 10, comprising solid-solution heat treatment and artificial aging, substantially improves performance and reliability of crank arm 10. Advantageous grain-boundary orientation, resulting from the forging process, is not substantially affected by proper heat treatment.

Figure 5:
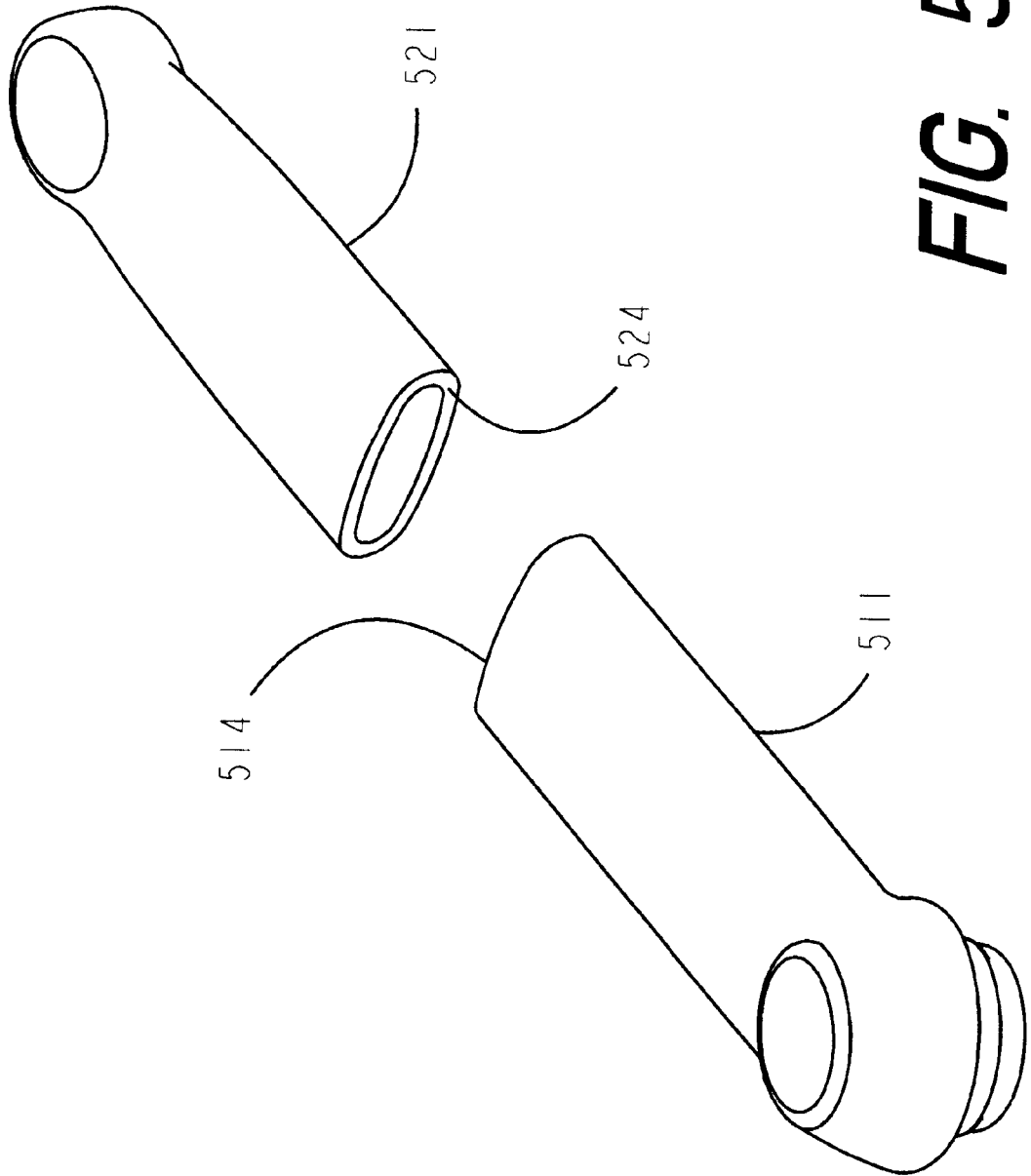
FIG. 5 shows an exploded perspective view similar to FIG. 4, showing an alternative configuration for the mating surfaces of the two partial crank arm components.

FIG. 5 shows alternative mating surfaces 514, 524 of crank arm components 11, 21. For a purpose of illustration, surfaces 514, 524 are planes normal a long axis of crank arm 10. Planar surfaces 514, 524 are preferred over modified-scarf surfaces 14, 24 for certain embodiments of the invention. For example, use of an automated, or computer-controlled welding apparatus may be facilitated by planar surfaces 514, 524. Such apparatus may produce extremely consistent welds of high quality that do not require the extra surface area and strength of modified-scarf surfaces 14, 24.

Surfaces 514, 524 may comprise still other alternative configurations, as dictated by a particular embodiment's material selection, manufacturing processes, or intended use of crank arm 10. In general, the means of affixing components 511, 521 predominantly dictates the most appropriate configuration for mating surfaces 514, 524.

Figure 6:
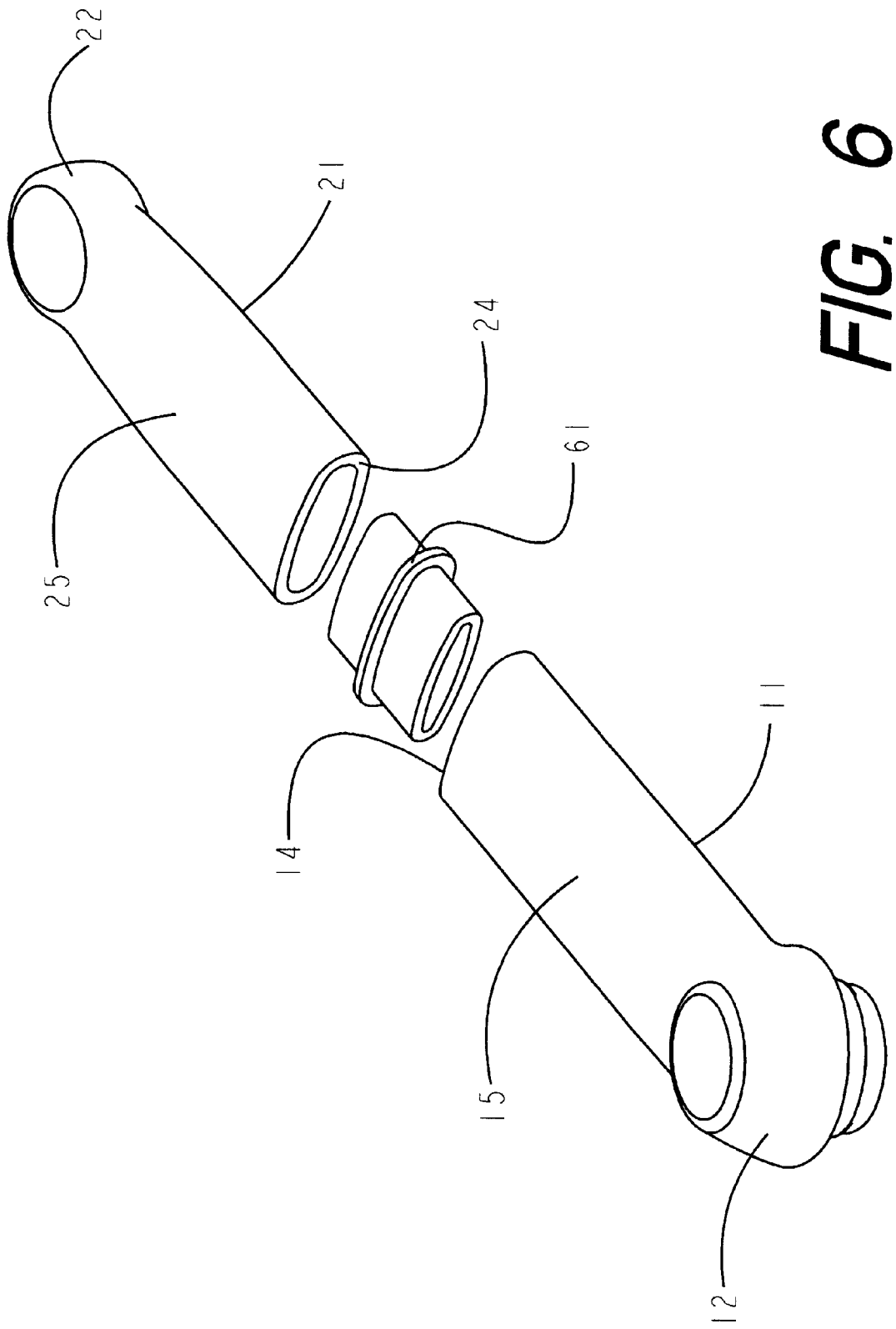
FIG. 6 shows an exploded perspective view similar to FIG. 5, wherein the partial crank arm components are to be affixed with the aid of a sleeve/lug.

FIG. 6 shows an alternative embodiment of crank arm 10, wherein first and second partial crank arm components 11, 21 are permanently affixed by means of an affixion sleeve 61 that is positioned within crank arm 10. During fabrication of crank arm 10, sleeve 61 is partially inserted slidably within first tubular portion 15, and partially inserted slidably within second tubular portion 25. Sleeve 61 is securely bonded, brazed, or otherwise affixed to tubular portions 15, 25. Tensile and compressive normal forces are transferred at least partially from component 11 to component 21 as shear forces between tubular portions 15, 25 and sleeve 61. Sleeve 61 may, alternatively, be enlarged to permit partial slidable insertion of tubular portions 15, 25 within sleeve 61. Thus, affixation sleeve 61 may slidably engage with, and affix to, first and second tubular portions 15, 25 proximate to mating surfaces 14, 24.

Figure 7:
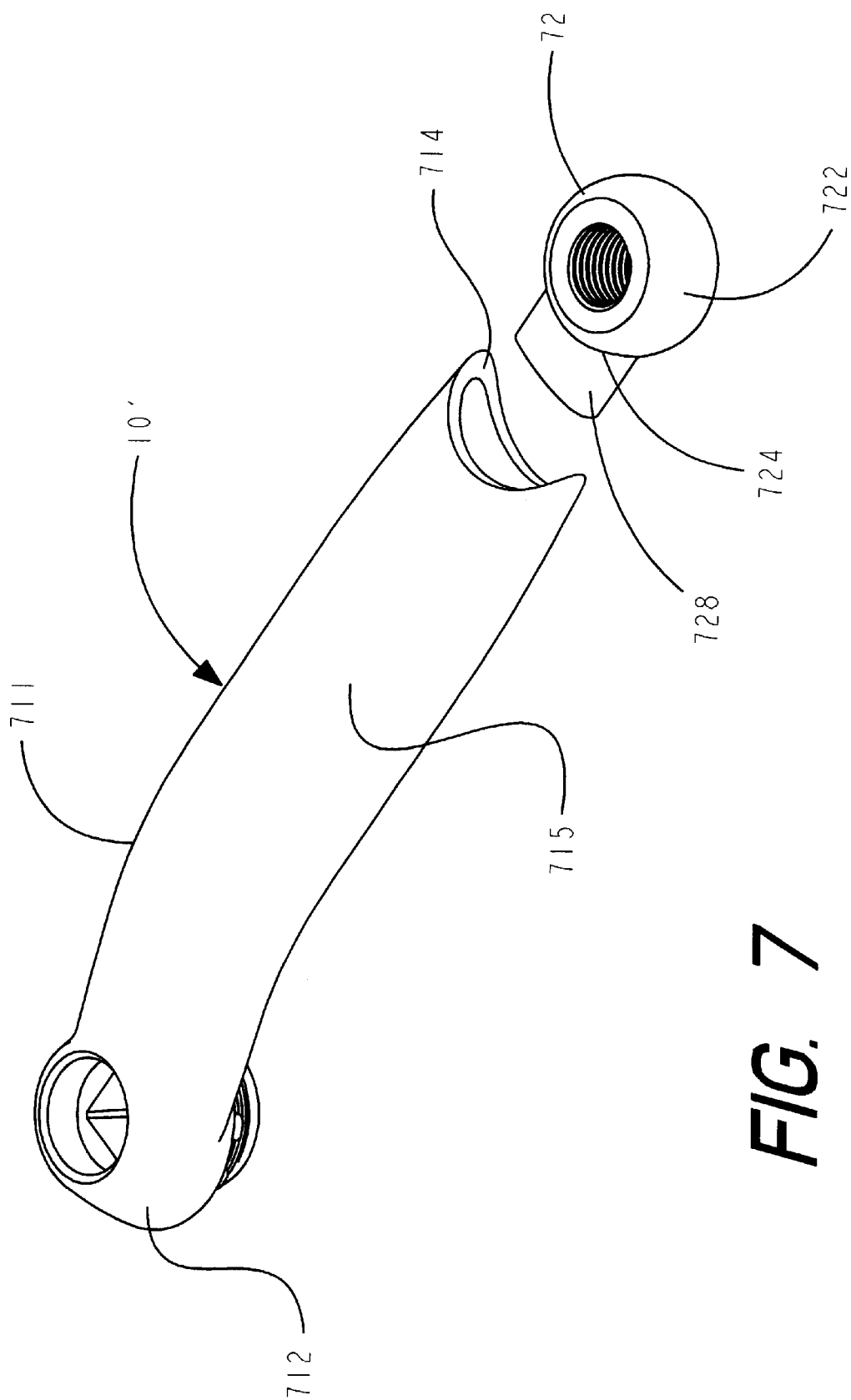
FIG. 7 shows an exploded perspective view similar to FIG. 5, showing an alternative embodiment comprising two partial crank arm components, only one of which has a tubular portion.

FIG. 7 shows an alternative embodiment of the invention, wherein a first partial crank arm component 711 comprises a first mounting-boss portion 712 monolithic with a tubular portion 715 that terminates in a first mating surface 714 that is distal from first mounting-boss portion 712. Mating surface 714 is distal from first mounting-boss portion 712 to ensure that it is not proximate to a region of maximum bending moment. A second partial crank arm component 721 comprises a second mounting-boss portion 722, and mating surface 724. Components 711, 721 are permanently affixed at surfaces 714, 724 to produce crank arm 10'. Crank arm 10' requires that only one component, component 711, comprise a tubular portion, which may result in lower tooling and fabrication cost. Disposing mating surface 724 proximate to second mounting-boss portion 722 is permissible, as portion 722 is a region of negligible bending moment during use of crank arm 10'. Further, a welded joint between thin-wall tube portion 715 and relatively-solid component 721 is also permissible for the same reason.

For a purpose of illustrating yet another means of affixing partial crank arm components, component 721 comprises a lug 728, which may be solid or tubular. Lug 728 is slidably inserted within tubular portion 715 to provide a mechanical interlock between components 711, 721. Lug 728 improves strength and reliability of a bonding, brazing, or other process used to affix components 711, 721. Lug 728 may alternatively be sized to slidably fit over tubular portion 715 to provide a mechanical interlock. Thus, a portion of one component may be slidably inserted within, and engage with, a receiving portion of the other component to produce a mechanical interlock. A similar mechanical interlock may be utilized with other embodiments of the invention, as well. Alternative affixation means, without lug 728, may also be used to produce crank arm 10'. As with all embodiments of the invention, material selection, fabrication processes and intended use dictate the preferred means of affixing components together.

It is to be understood that the foregoing disclosure is representative, and not exhaustive, of the subject matter of the present invention. Further modifications may be employed without departing from the spirit of the invention, and features specific to a particular embodiment shown may be utilized with other embodiments. The scope of the invention is not limited by the specific structures disclosed, but is, instead, defined by the claims, as set forth below.

We claim:

1. A bicycle crank arm comprising:
    a) a first partial crank arm component (11) comprising a first mounting-boss portion (12) monolithic with a first tubular portion (15), said first tubular portion (15) terminating in a first mating surface (14) that is distal from said first mounting-boss portion (12);
    b) a second partial crank arm component (21) comprising a second mounting-boss portion (22) monolithic with a second tubular portion (25), said second tubular portion (25) terminating in a second mating surface (24) that is distal from said second mounting-boss portion (22);
    c) means of affixing said first mating surface (14) to said second mating surface (24), said mating surfaces being at least partially transverse to a longitudinal axis of said crank arm;
    d) mounting means (13) disposed within the first mounting-boss portion (12) for mounting a crank spindle, and mounting means (23) disposed within the second mounting-boss portion (22) for mounting a pedal.

2. The bicycle crank arm of claim 1 wherein said affixation means comprise a portion of one said component being inserted within, and engaging with, a receiving portion of the other component to mechanically interlock them together.

3. The bicycle crank arm of claim 1 further including a sleeve (61), wherein said sleeve (61) enhances said affixation means by increasing the surface area of the joint.

* * * * *